United States Patent [19]

Goldfischer

[11] 4,121,210

[45] Oct. 17, 1978

[54] TWO DIMENSIONAL MIPS

[75] Inventor: Lester Irving Goldfischer, New Rochelle, N.Y.

[73] Assignee: The Singer Company, Little Falls, N.J.

[21] Appl. No.: 811,109

[22] Filed: Jun. 29, 1977

[51] Int. Cl.² .............................................. G01S 9/46
[52] U.S. Cl. .................................................... 343/8
[58] Field of Search ............................................ 343/8

[56] References Cited

U.S. PATENT DOCUMENTS

| 3,095,563 | 6/1963 | Vladimir | 343/8 |
| 3,247,511 | 4/1966 | Burrows | 343/8 |
| 3,423,752 | 1/1969 | Schwartz | 343/8 |
| 3,833,906 | 9/1974 | Augustine | 343/8 X |
| 3,991,398 | 11/1976 | Andermo et al. | 343/8 X |
| 3,992,709 | 11/1976 | Watanabe et al. | 343/8 X |
| 4,023,171 | 5/1977 | Stavis | 343/8 |
| 4,041,293 | 8/1977 | Kihlberg | 343/8 X |

Primary Examiner—Malcolm F. Hubler
Attorney, Agent, or Firm—Laurence A. Wright; Thomas W. Kennedy

[57] ABSTRACT

A two dimensional velocity sensor mountable on an aircraft employs a CW radar which illuminates the ground with radar energy. Two transmitters which are alternately activated cause the speckle pattern to move as a whole in the opposite direction at the same speed. Two receivers mounted parallel to the heading axis of the aircraft sense the same power of the backscattered pattern except for a delay. By means of a time-shared processor and computer, this sensed delay provides heading velocity as well as cross-heading velocity.

7 Claims, 5 Drawing Figures

T IS TRANSMITTER
R IS RECEIVER

T IS TRANSMITTER
R IS RECEIVER $d = S \cos \theta$, $\theta = 22.5°$ $\dfrac{1}{\tau} = \dfrac{2V \cos(\delta + \theta)}{d}$, $\tau =$ DELAY $f_x = \dfrac{K}{\tau}$, $f_x =$ MIPS OUTPUT

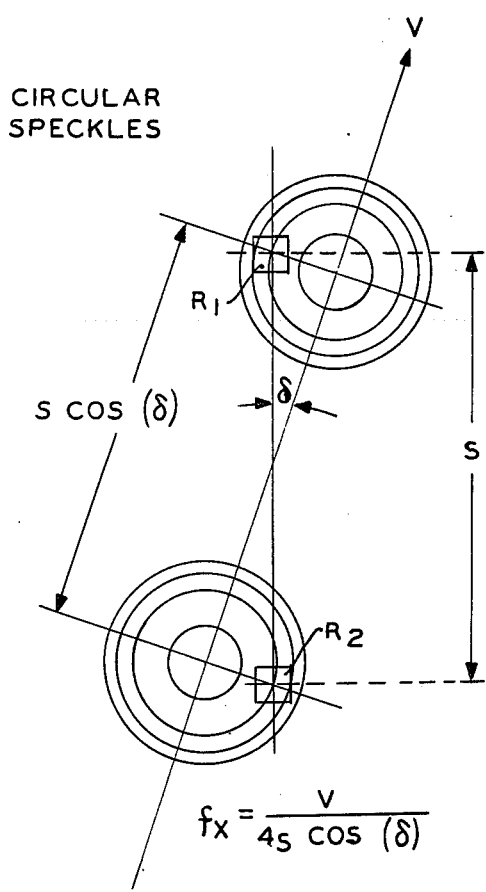
FIG. 3A
PRIOR ART
FIG. 3B
ELLIPTICAL SPECKLES
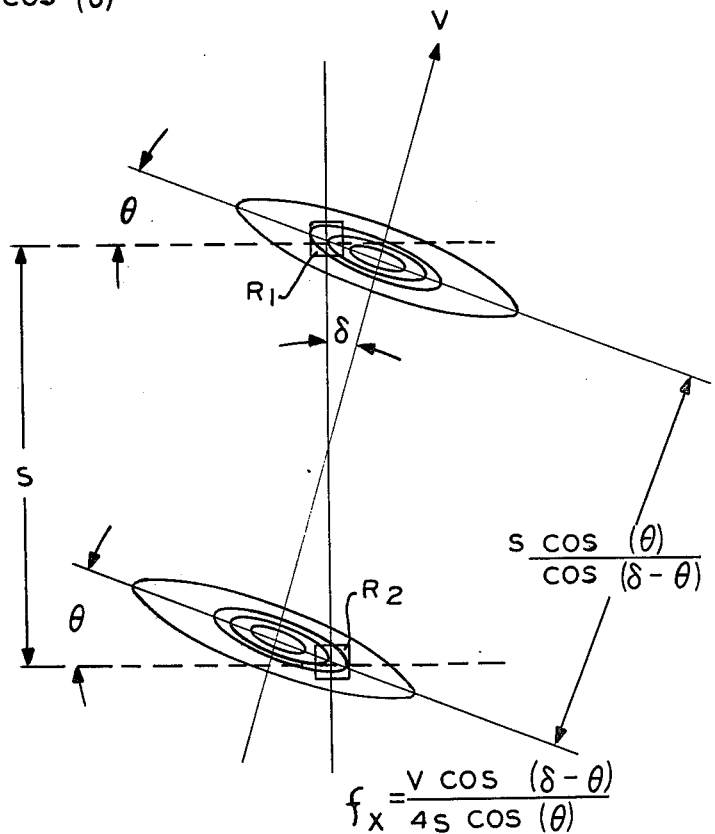

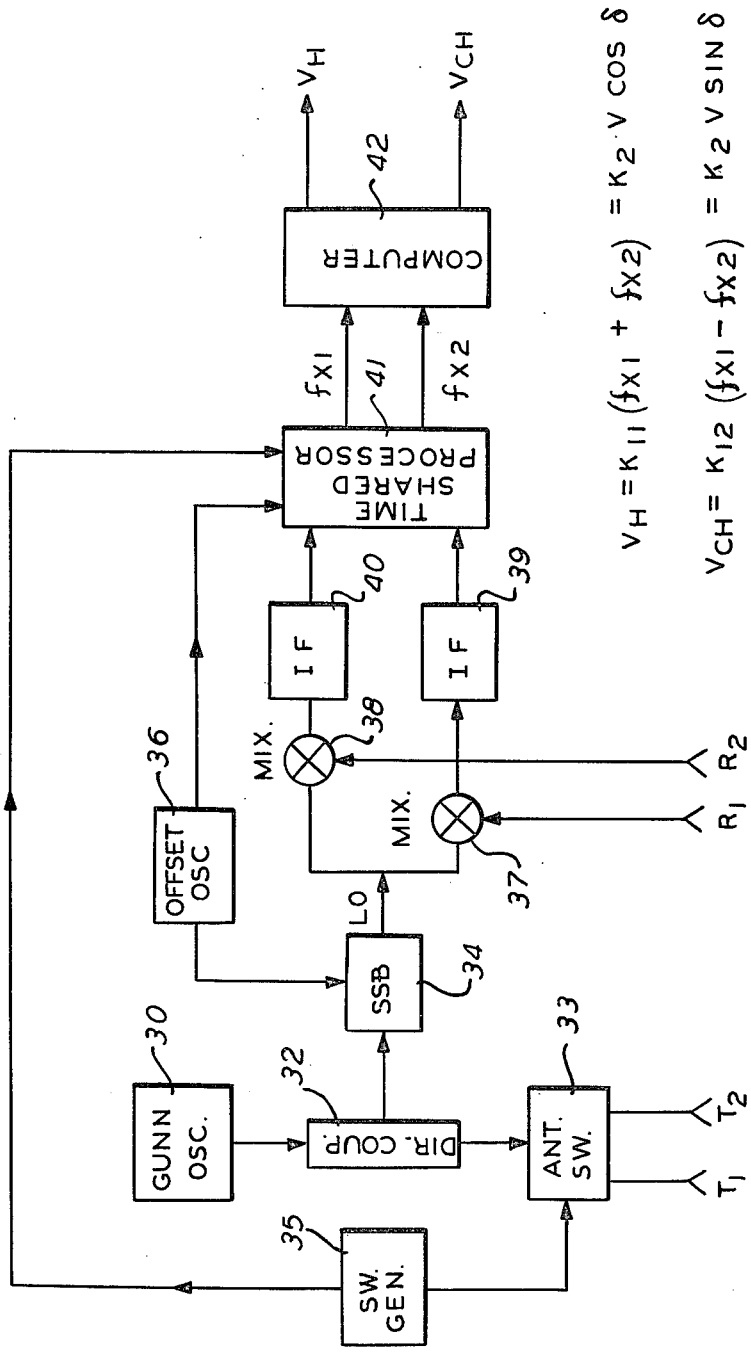

TWO DIMENSIONAL MIPS

This invention relates to a velocity sensor. More particularly, this invention relates to a velocity sensor applicable for use in aircraft which provide sensing of velocity in two dimensions.

BACKGROUND OF THE INVENTION

Navigation by the use of dead reckoning requires very accurate knowledge of velocity and heading as inputs for the navigation computer. A large number of military aircraft use Doppler navigation radar to provide the true ground velocity measurement for this purpose. The use of Doppler radar could be extended to a broader spectrum of aircraft types if its capability and/or cost could be improved.

For example, very high performance, long range aircraft would benefit from improved accuracy and better operation over water. At the other end of the aircraft spectrum, low performance aircraft could use a lower cost Doppler radar.

Operation over water poses a twin difficulty for current Doppler radar ground speed indications. When the water surface is very smooth, loss of signal is experienced forcing the Doppler radar navigator into memory. For other sea conditions, Doppler systems experience a change in groundspeed calibration constant unless very narrow beams are used. The search for solutions to these problems has led to improvements in Doppler radars with respect to the calibration shift over water. It has also led to consideration of alternatives to Doppler radar such as Microwave Interference Pattern Sensor (MIPS) which, by way of contrast, functions well over smooth water. Since its beams are pointed straight down, operations over water result in an increase in signal level relative to operation over land or rough water. Furthermore, the capability of reduced over water calibration shift is inherent to the MIPS technique. This improved operation over water is a real benefit offered by MIPS relative to conventional Doppler radar navigators.

In my U.S. Pat. No. 3,838,424 and U.S. Pat. No. 3,974,500 assigned to the same assignee as the present invention, there is described a MIPS velocity sensing technique which makes use of the speckled nature of the power backscattered from the ground when it is illuminated by a monochromatic radar beam. Translation of the source of the radar beam; i.e., the transmitting antenna, causes the entire speckle pattern to move as a whole in the opposite direction at the same speed. A pair of receiving horns which lie essentially along the line of motion will sense essentially the same power variations except for a delay. With a fixed horn separation, any measure of delay is also a measure of vehicle velocity.

As disclosed in my patents cited above, a previous two axis MIPS used a single large transmitting horn and three small receiving horns. Its speckles were on the average circular and had no preferred orientation. Hence, for that speckle pattern arrangement, the effective distance between any two receiving horns was the actual separation projected onto the velocity vector. As a result, a fairly cumbersome computer was required to generate two orthogonal velocity components and a considerably smaller drift angle could be tolerated for a specific pairing arrangement among the three receiving horns.

BRIEF DESCRIPTION OF THE INVENTION

A two dimensional velocity sensor, which may be mounted on an aircraft vehicle, employing a continuous wave radar which illuminates the ground with a monochromatic radar beam mounted at a predetermined angle to the heading axis of the aircraft. Two transmitters are activated alternately and cause the speckle pattern to move as a whole in the opposite direction at the same speed. A pair of receivers mounted to lie parallel with heading axis of the aircraft on which the instrument is mounted sense essentially the same power variations except for a delay. The sensed delay in a processor and computer provides the heading velocity and cross-heading velocity of the aircraft.

Accordingly, it is an object of this invention to provide a two dimensional velocity sensor wherein the computer is simplified because of technique of alignment of the twin antennas with relation to the heading axis.

These and other objects, features and advantages of the present invention will become more apparent from the following description taken in conjunction with the accompanying drawings wherein:

FIG. 3a shows the mean speckle shape produced by the prior art sensor;

FIG. 3b shows the mean speckle shape produced by the present invention; and

FIG. 4 is a functional block diagram showing the components of the present invention.

Figure 1:
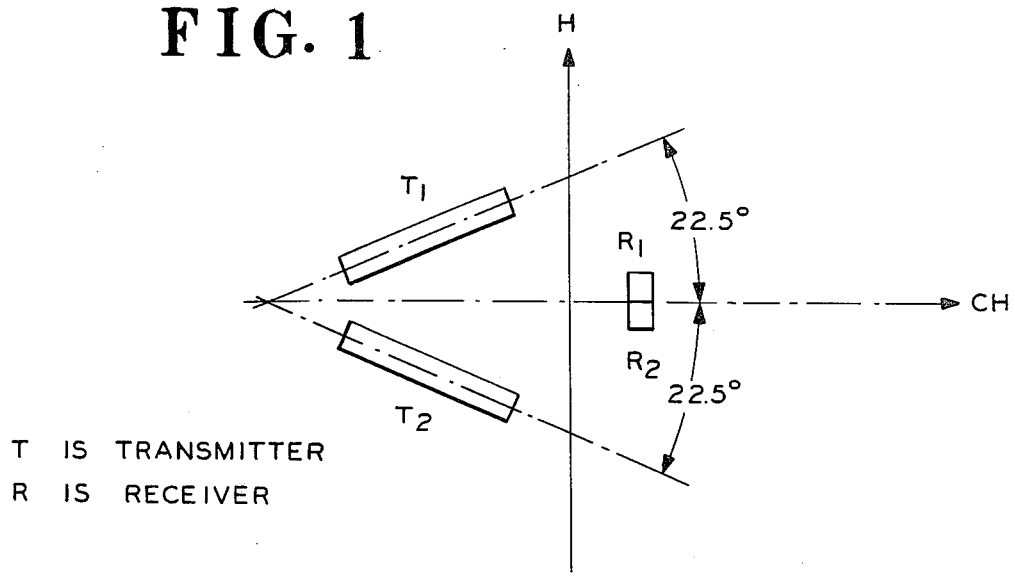
FIG. 1 shows the placement of the transmitting and receiving horns in relation to the direction of travel of the aircraft on which they are mounted.

Referring now to FIG. 1, the manner of aligning the transmitting antenna horns in relation to the receiver and heading axis of the aircraft is shown. In the MIPS technique, a frequency is generated which is proportional to the reciprocal of the delay. Thus, in a one-axis MIPS, the direction of motion is constrained to be along the line connecting the centers of the two horns and the output frequency is directly proportional to velocity. For a two-axis version of MIPS, it is necessary to measure two components of horizontal velocity and it would be most desirable that the two components be orthogonal to each other. The way this is achieved in the invention is to use a pair of transmitting horns $T_1$ and $T_2$ each with a long narrow aperture aligned with the heading axis H, as shown, to describe an angle of $\theta$ above the cross-heading CH axis for $T_1$ and an angle of $\theta$ below the cross-heading axis, noting that the heading H and cross-heading CH axes are normal to each other. It is a further requisite that the two receiving horns $R_1$ and $R_2$ have their centers connecting along a line parallel to the heading axis H. The value of $\theta$ used for illustrative purposes in FIG. 1 is 22.5°; its exact magnitude is not critical.

When either transmitting horn $T_1$ or $T_2$ is energized, long narrow speckles will be produced; the long axis of the average speckle will lie along the long axis of the horn which produced it. Analysis shows that the dimension of the average speckle (i.e., the dimensions of the 50% contour of the two dimensional auto-correlation function of the backscattered speckle pattern) are comparable to the dimensions of the transmitting aperture.

As is indicated in FIG. 1, the antenna assembly is installed in an aircraft with the line connecting the receiving horns parallel to heading. For any drift angle except zero, the speckles will be displaced laterally (relative to the airframe) as well as longitudinally. As long as the mean speckle is not shifted by more than half its long direction in moving from one receiving horn to the next, the loss of correlation between the two receiver video signals will be acceptably small. In the context of the dimensions shown in FIG. 1, this means that drift angles up to 52° could be handled.

Figure 2:
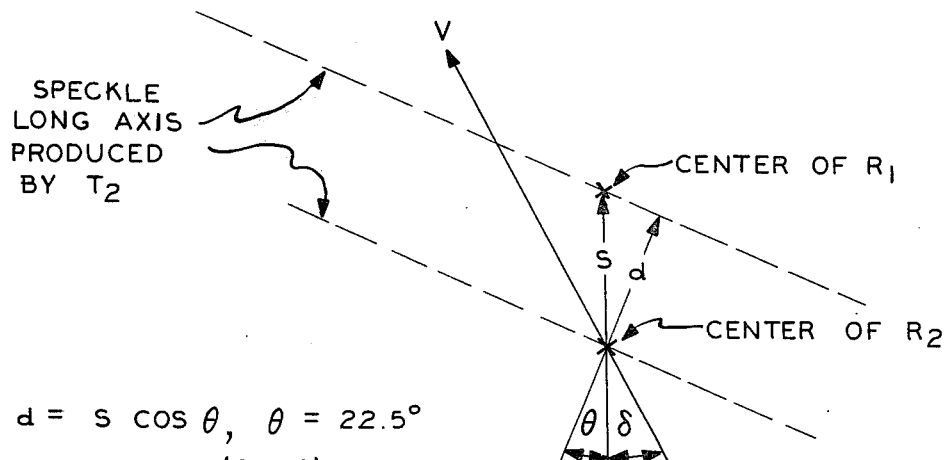
FIG. 2 shows the geometry of speckle axis produced by one of the transmitter horns.

Within this last limitation, which would pose no hardship for fixed wing aircraft, the speckles may be approximated by straight lines of indefinite length. The geometry of the situation for transmitting horn $T_2$ is depicted in FIG. 2. As indicated there, the effective distance, $d$, between receiving horns $R_1$ and $R_2$ is the projection of the actual distance, S, onto a line perpendicular to the line of the speckle (i.e., the direction of its long dimension). Hence, the MIPS output for this transmitter horn would be the component of the velocity along a line normal to the long dimension of the horn aperture.

In FIG. 2, the angle $\theta$ represents the angle between the short axis of the transmitting horn and the line connecting the center of the two receiving horns. $\delta$ represents the drift angle relative to the airframe. The projected distance, $d$, between receiving horns $R_1$ and $R_2$ is given as:

$$d = S \cos \theta, \theta = 22.5°.$$

The delay $\tau$ between the signals received by $R_1$ and $R_2$ is given as:

$$1/\tau = (2V \cos (\delta + \theta)/d),$$

and the output frequency of the sensor is given as:

$$f_x = (K/\tau),$$

where K is a constant and V is the velocity magnitude.

Turning briefly to FIGS. 3a and 3b, there is shown the mean speckle shape received by the prior art receivers and that received by the receivers of the present invention. More specifically, in FIG. 3a, the transmitting apertures of $T_1$ and $T_2$ of the prior art were so oriented and designed to generate circular backscattered speckles for receivers $R_1$ and $R_2$. In FIG. 3b, the backscattered pattern generated by the transmitting aperture of the present invention is seen to have elliptical speckles. The use of elongated transmitting apertures produces speckles of the same orientation and comparable size. With such speckles, only the velocity component normal to the axis of the speckle may be sensed. In the prior art, the circular pattern has no preferred orientation. Therefore, the effective distance between any two receiving horns was the actual separation projected onto the velocity vector. Because of this factor, a cumbersome computer was required in order to provide two orthogonal velocity components and a considerably smaller drift angle could be tolerated for a specific pairing arrangement amongst three receiving horns. With the present invention, a less cumbersome computer is required. The computer is designed to take the sum and difference of the two receiver output frequencies and apply the appropriate scale factors in order to provide along-heading velocity from the summing of the frequencies and to provide drift velocity from the differencing of the frequencies.

Referring to FIG. 4, a functional block diagram of the present invention is shown. The function of the blocks in FIG. 4 are conventional and for details of their operation, reference may be had to my prior patents cited above.

The two antennas, $T_1$ and $T_2$ emit a continuous wave radar output signal generated in Gunn oscillator 30 and applied to $T_1$ and $T_2$ by way of directional coupler 32 and antenna switch 33. Generally, the purpose of directional coupler 32 is to direct the radar energy to antennas $T_1$ and $T_2$ and to attenuate a small portion of the energy to the single side band generator 34 for ultimate use in the receiver section of the sensor. Antenna switch 33, under the control of switch generator 35, has the job of alternately switching from antenna $T_1$ to antenna $T_2$ so that the ground is illuminated by radar energy by $T_1$ and $T_2$ in a predetermined sequence. A signal from switch generator 35 is also applied to time shared processor 40 in order to keep track of the antenna which is being monitored during a given receiving period.

The receiver horns $R_1$ and $R_2$ traverse the backscattered return signal as shown in FIG. 3b. However, as stated above, although the power of the received signal in the receiver horns is equal, there is a delay between receipt of the signals due to the spatial separation of the receiver horns. The return signals are mixed in mixers 37 and 38 with a signal from block 34, which in essence is a local oscillator. An offset oscillator 36 provides an output to block 34 and time shared processor 40 in order to avoid antenna leakage frequencies in the receiver section of the sensor. From mixers 37 and 38, the signals are applied to IF amplifiers 39 and 40 respectively for further application to time shared processor 41. In block 41, cross-over frequencies $f_{x_1}$ and $f_{x_2}$ are generated in the manner described in my previous patents cited above. The two frequency signals $f_{x_1}$ and $f_{x_2}$ are then applied to computer 42, which in turn computes the along-heading velocity $V_H$ and the cross-heading velocity $V_{CH}$. The formula for computing the along-heading velocity may be given as:

$$V_H = K_{11}(f_{x_1} + f_{x_2}) = K_2 V \cos \delta,$$

and the cross-heading velocity may be given as:

$$V_{CH} = K_{12}(f_{x_1} + f_{x_2}) = K_2 V \sin \delta,$$

where K is a constant, V is velocity, $f_{x_1}$ and $f_{x_2}$ are cross-over frequencies of the signals received from receiving horns $R_1$ and $R_2$ respectively.

From the foregoing, a two dimensional velocity sensor has been described. While a particular embodiment of the invention has been shown and described, modifications may be made and it is intended in the following claims to cover the embodiments which fall within the true spirit and scope of the invention.

What is claimed is:

1. A velocity sensor comprising:

a pair of transmitting antennas mounted at a predetermined angle relative to the heading axis of the vehicle upon which said velocity sensor is mounted for illuminating an area of the ground with a source of radar energy, said transmitter antennas having elongated transmitting apertures whereby speckles having the same orientation and size of the transmitting antennas are produced, a pair of receiving antennas having the line connecting their centers aligned parallel to the heading axis of said vehicle for receiving backscattered elliptically shaped speckles crossing said receiver at the same predetermined angle as the angle of said transmitting antennas said receivers sensing only the velocity component normal to the long axis of said transmitter, means for sampling a portion of the signal from said transmitters, means for mixing said signal from said sampling means with signals received from said pair of receiving antennas, means for deriving first and second frequency signals indicative of velocity, and means responsive to said first and second frequency signals for computing heading velocity and cross-heading velocity.

2. The velocity sensor of claim 1 comprising:

means for alternately activating each of said pair of transmitting antennas.

3. The velocity sensor of claim 2 comprising:

means for eliminating leakage signals between said antenna signal and said receiver signals.

4. The velocity sensor of claim 3 comprising:

means for computing said heading velocity so that $$V_H = K_{11}(f_{x_1} + f_{x_2}) = K_2 V \cos \delta$$

and said cross-heading velocity is $$V_{CH} = K_{12}(f_{x_1} - f_{x_2}) = K_2 V \sin \delta$$

where $V_H$ = heading velocity, $V_{CH}$ = to cross-heading velocity, $K$ = constant, $f_{x_1}$ = the frequency of signals derived from the first receiver, and $f_{x_2}$ = the frequency of signals derived from the second receiver.

5. A velocity sensor comprising:

a pair of transmitting antennas mounted in a predetermined position relative to the heading axis of the vehicle upon which said velocity sensor is mounted for illuminating an area on the ground with a source of radar energy so that the backscattered return signals have elliptically shaped speckles, a pair of receiving antennas having the line connecting their centers aligned parallel to the heading axis of said vehicle and oriented so as to bisect the obtuse angle formed by the long axis of said pair of transmitting antennas, means for alternately activating each of said pair of transmitting antennas, means responsive to said received speckle signals for deriving first and second frequency signals indicative of velocity, and means responsive to said first and second frequency signals for computing heading velocity and cross-heading velocity.

6. The velocity sensor of claim 5 comprising:

aperture means in said transmitting antennas for providing a signal output wherein the component of the velocity lies along a line normal to the long dimension of said aperture.

7. A velocity sensor comprising:

a pair of transmitting antennas mounted in a predetermined position relative to the heading axis of the vehicle upon which said velocity sensor is mounted for illuminating an area on the ground with a source of radar energy so that the backscattered return signals have elliptically shaped speckles said transmitting antennas mounted so that the long aperture of each of said transmitters describes an equal angle above and below the cross-heading axis of said vehicle, a pair of receiving antennas having the line connecting their centers aligned parallel to the heading axis of said vehicle for receiving said backscattered speckle signals said receiving antennas oriented so that only the velocity component normal to the long axis of said transmitted speckles is sensed, means for alternately activating each of said of transmitting antennas, means responsive to said received speckle signals for deriving first and second frequency signals indicative of velocity, and means responsive to said first and second frequency signals for computing heading velocity.

* * * * *

UNITED STATES PATENT AND TRADEMARK OFFICE
CERTIFICATE OF CORRECTION

PATENT NO. : 4,121,210

DATED : October 17, 1978

INVENTOR(S) : Lester Irving Goldfischer

It is certified that error appears in the above-identified patent and that said Letters Patent are hereby corrected as shown below:

In the specification, Column 1, line 1, insert --The Government has rights in this invention pursuant to Contract No. N62269-76-C-0471 awarded by the Department of the Navy.--

Signed and Sealed this

Third Day of April 1979

[SEAL]

Attest:

RUTH C. MASON
Attesting Officer

DONALD W. BANNER
Commissioner of Patents and Trademarks